Sept. 22, 1959   J. HANUS ET AL   2,905,375
AIR MIXING AND FLOW CONTROL DEVICE
Filed Jan. 14, 1958
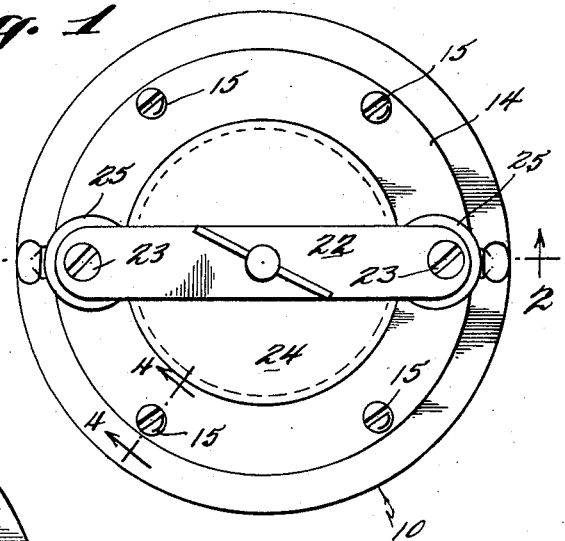
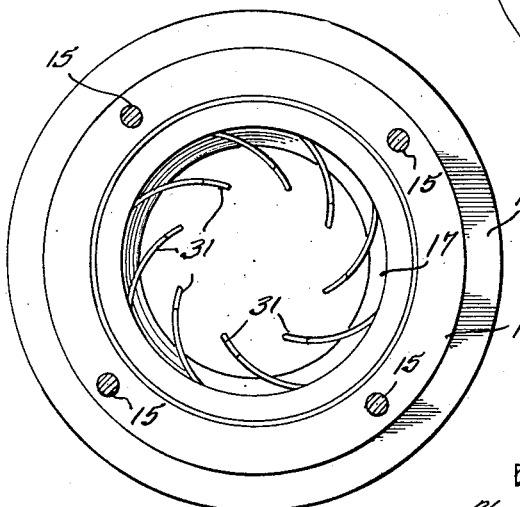
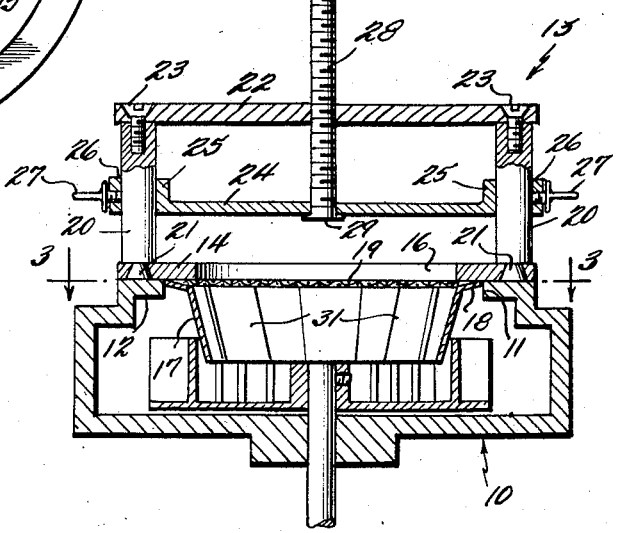
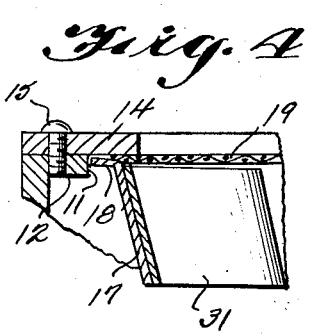
INVENTORS
JOHN HANUS
SYLVESTER N. PARKER
BY Kimmel & Crowell
ATTORNEYS

2,905,375
AIR MIXING AND FLOW CONTROL DEVICE

John Hanus and Sylvester N. Parker, Appleton, Wis.

Application January 14, 1958, Serial No. 708,833

1 Claim. (Cl. 230—114)

The present invention relates to air mixing and flow controlling devices, and is an improvement over the structure embodied in Patent 2,235,706, issued to John Hanus, on March 18, 1941.

The primary object of the invention is to provide an air controlling device for an air intake port having turbulence creating members formed therein.

Another object of the invention is to provide a structure of the class described above having turbulence creating members projecting spirally inwardly to intersect the air flow path.

A still further object of the invention is to provide a device of the class described above combined with means for filtering dirt particles from the air as the air passes through the device.

Other objects and advantages will become apparent in the following specification when considered in the light of the attached drawings, in which:

Figure 1 is a side elevation of the invention.

Figure 2 is a vertical cross-section taken along the line 2—2 of Figure 1, looking in the direction of the arrows, with the invention illustrated as attached to a blower.

Figure 3 is a fragmentary transverse cross-section taken along the line 3—3 of Figure 2, looking in the direction of the arrows.

Figure 4 is an enlarged fragmentary detail cross-section taken along the line 4—4 of Figure 1, looking in the direction of the arrows.

Referring now to the drawings in detail wherein like reference characters indicate like parts throughout the several figures, the reference numeral 10 indicates generally a blower or other device having an air inlet port 11 through which the passage of air is to be controlled.

The blower 10 includes a side wall 12 in which the inlet port 11 is formed, and an air mixing and flow controlling device, generally indicated at 13, is positioned in engagement with the side wall 12.

The air mixing and control device 13 includes a generally circular base plate 14 detachably secured to the side wall 12 by means of bolts 15. The base plate 14 is provided with an axial inlet opening 16 coaxially aligned with the inlet port 11 of the side wall 12.

The base plate 14 on the side thereof adjacent the side wall 12 is provided with a frusto-conical nozzle 17 which extends through the inlet port 11 for discharging air within the blower 10. The nozzle 17 is provided with a radially outwardly extending annular flange 18 at the end thereof adjacent the base plate 14.

An air cleaning metallic screen 19 having a generally flat form is positioned in engagement with the side of the base plate 14 adjacent the side wall 12. The flange 18 on the nozzle 17 engages the edges of the screen 19 and is welded to the base plate 14 securing the nozzle 17 and the screen 19 thereto.

A pair of combined valve supporting and guiding posts 20 are fixedly secured to the base plate 14 in diametrically opposed relation having reduced portions 21 on their ends contacting the base plate 14. The reduced portions 21 are riveted to the base plate 14, as best shown in Figure 2, rigidly mounting the posts 20 in upright relation thereon. A connecting bar 22 extends parallel to the base plate 14 and has its opposite ends secured to the outer ends of the posts 20 by means of cap screws 23.

A valve plate 24 of substantially circular formation is disposed in confronting relation to the base plate 14 and is substantially larger in diameter than the diameter of the inlet opening 16 in the base plate 14. The valve plate 24 is provided with a pair of sleeves 25 secured to the peripheral edges thereof in diametrically opposed relation.

The sleeves 25 have bores 26 extending therethrough with the axes of the bores 26 arranged perpendicular to the valve plate 24. The posts 20 slidably engage through the bores 26 of the sleeves 25 to guide the valve plate 24 in its movement toward and away from the base plate 14. Hand operated set screws 27 extend through the sleeves 25 and provide means for locking the valve plate 24 in adjusted position on the posts 20.

A threaded shaft 28 is threaded through the connector bar 22 and has the end 29 thereof swivelly connected to the valve plate 24. The threaded shaft 28 has a handle 30 fixed to the outer end thereof so that the shaft 28 can be rotated to move the valve plate 24 toward and away from the base plate 14 to close the inlet opening 16 as desired.

The nozzle 17 is provided with a plurality of arcuate fins 31 arranged internally thereof. The fins 31 have their outer edges secured to the inner surface of the nozzle 17 in circumferentially equispaced relation with the fins 31 extending spirally inwardly therefrom. The fins 31 have their inner ends terminating in a circle concentric with the nozzle 17.

In the use and operation of the invention, the base plate 14 is fixed to the side wall 12 of a blower 10, or any other device having an air inlet port 11 formed therein, such as the air inlet for burners, internal combustion engines, and similar devices. The nozzle 17 extends through the inlet port 11 and the valve plate 24 is adjusted with respect to the base plate 14 to control the flow of air through the inlet opening 16.

As the air is drawn through the inlet opening 16, dirt is removed therefrom by the screen 19 and the fins 31 create turbulent movement of the air thoroughly mixing the air with vaporized fuel or gases contacted by the air, materially increasing the combustion factor of the fuel.

The fins can be of any size or pitch to meet varying conditions. The invention is not limited to, but may be used, for example, for automobiles, trains, boat motors, or in fact, all internal combustion engines of every type using forced blowers or without forced blowers.

Having thus described the preferred embodiment of the invention, it should be understood that numerous structural modifications and adaptations may be resorted to without departing from the scope of the appended claim.

What is claimed is:

In a device of the class described a housing, an outwardly discharging centrally open fan journalled in said housing, a base plate detachably secured to said housing, said base plate arranged perpendicularly to the axis of said fan and having an axial inlet port, a frusto-conical nozzle disposed on one side of said plate, said nozzle projecting into the open center of said fan and terminating intermediate the opposite sides of said fan, a flange carried by the base of said nozzle, means securing said flange to said plate with said nozzle in axial alignment with said inlet port, a plurality of arcuate fins having their outer edges fixedly secured to the inner face of said nozzle in circumferentially spaced relation with the contact between each of said fins and said nozzle forming a straight line, said fins each extending inwardly from the inner face of said nozzle toward the axis of said nozzle in spiral form, said arcuate fins each having the chord thereof lying in a plane perpendicular to the axis of said nozzle, and adjustable means on said base plate for selectively closing said inlet port, said nozzle and said fins producing great turbulence in the air passing therethrough discharging the air centrally of said fan.

References Cited in the file of this patent

UNITED STATES PATENTS

| | | |
|---|---|---|
| 1,787,654 | Anderson | Jan. 6, 1931 |
| 1,787,655 | Anderson | Jan. 6, 1931 |
| 1,795,588 | Wilson | Mar. 10, 1931 |
| 1,978,129 | Downs | Oct. 23, 1934 |
| 1,989,413 | Hagen | Jan. 29, 1935 |
| 2,235,706 | Hanus | Mar. 18, 1941 |
| 2,690,293 | Muhlberg | Sept. 28, 1954 |
| 2,798,658 | McDonald | July 9, 1957 |

FOREIGN PATENTS

| | | |
|---|---|---|
| 392,782 | Great Britain | May 25, 1933 |